United States Patent
Saidaminov et al.

(10) Patent No.: US 11,549,056 B2
(45) Date of Patent: Jan. 10, 2023

(54) COMPOSITIONS AND METHODS RELATING TO LUMINESCENT STRUCTURES

(71) Applicant: King Abdullah University of Science and Technology, Thuwal (SA)

(72) Inventors: Makhsud I. Saidaminov, Thuwal (SA); Osman M. Bakr, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 116 days.

(21) Appl. No.: 16/323,824

(22) PCT Filed: Aug. 25, 2017

(86) PCT No.: PCT/IB2017/055135
§ 371 (c)(1),
(2) Date: Feb. 7, 2019

(87) PCT Pub. No.: WO2018/037387
PCT Pub. Date: Mar. 1, 2018

(65) Prior Publication Data
US 2019/0169498 A1    Jun. 6, 2019

Related U.S. Application Data

(60) Provisional application No. 62/380,131, filed on Aug. 26, 2016.

(51) Int. Cl.
C09K 11/66 (2006.01)
C01G 21/00 (2006.01)
C09K 11/08 (2006.01)

(52) U.S. Cl.
CPC .......... *C09K 11/665* (2013.01); *C01G 21/006* (2013.01); *C09K 11/0833* (2013.01); *C01P 2002/34* (2013.01); *C01P 2006/80* (2013.01)

(58) Field of Classification Search
CPC .. C09K 11/0833; C09K 11/665; C01G 21/006
See application file for complete search history.

(56) References Cited

U.S. PATENT DOCUMENTS

2016/0380136 A1* 12/2016 Ning .................. H01L 31/0368
                                                          252/519.4
2017/0217785 A1*  8/2017 Yang ................ H01L 21/02422

OTHER PUBLICATIONS

Saidaminov et al, "Pure Cs4PbBr6: Highly Luminescent Zero-Dimensional Perovskite Solids", ACS Energy Letters, Sep. 26, 2016, pp. 840-845 (Year: 2016).*
Kondo et al: "Fundamental optical absorption of CsPbI3 and Cs4PbI6", Solid State communications 124, 2002, pp. 211-214 (Year: 2002).*
Zhang et al "Zero-Dimensional Cs4PbBr6 Perovskite Nanocrystals", J. Phys. Chem. Lett. 2017, 8, pp. 961-965 (Year: 2017).*
Velazquez et al "Growth and characterization of pure and Pr3+-doped Cs4PbBr6 crystals", Journal of Crystal Growth, 310 (2208) pp. 5458-5463. (Year: 2008).*

(Continued)

*Primary Examiner* — Ngoc-Yen Nguyen
(74) *Attorney, Agent, or Firm* — Billion & Armitage

(57) ABSTRACT

Described herein are compositions and methods relating to luminescent structures.

17 Claims, 16 Drawing Sheets

(56) References Cited

OTHER PUBLICATIONS

Chen et al "Large-scale room-temperature synthesis and optical properties of perovskite-related Cs4PbBr6 fluorophores", J. Mater. Chem. Cm 2016,4,pp. 10646-10653. (Year: 2016).*
Beluze et al, "Scattering model for understanding the optical behavior of powders embedded in a plastic matrix", Journal of Applied Physics 98, 123104, 2005, 7 pages. (Year: 2005).*
Notification of Transmittal of the International Search Report and the Written Opinion of the International Searching Authority, or the Declaration for PCT/IB2017/055135 dated Dec. 12, 2017.
Nikl, et al., "Photoluminescence of Cs4PbBr6 crystals and thin films", Chemical Physics Letters, 306, 1999, 280-284.
Yantara, et al., "Inorganic halide perovskites for efficient light-emitting diodes", The Journal of Physical Chemistry Letters, v, 2015, 4360-4364.

* cited by examiner

"neon" green in color      FIG. 4(b)      Highly luminescent "neon" green in color

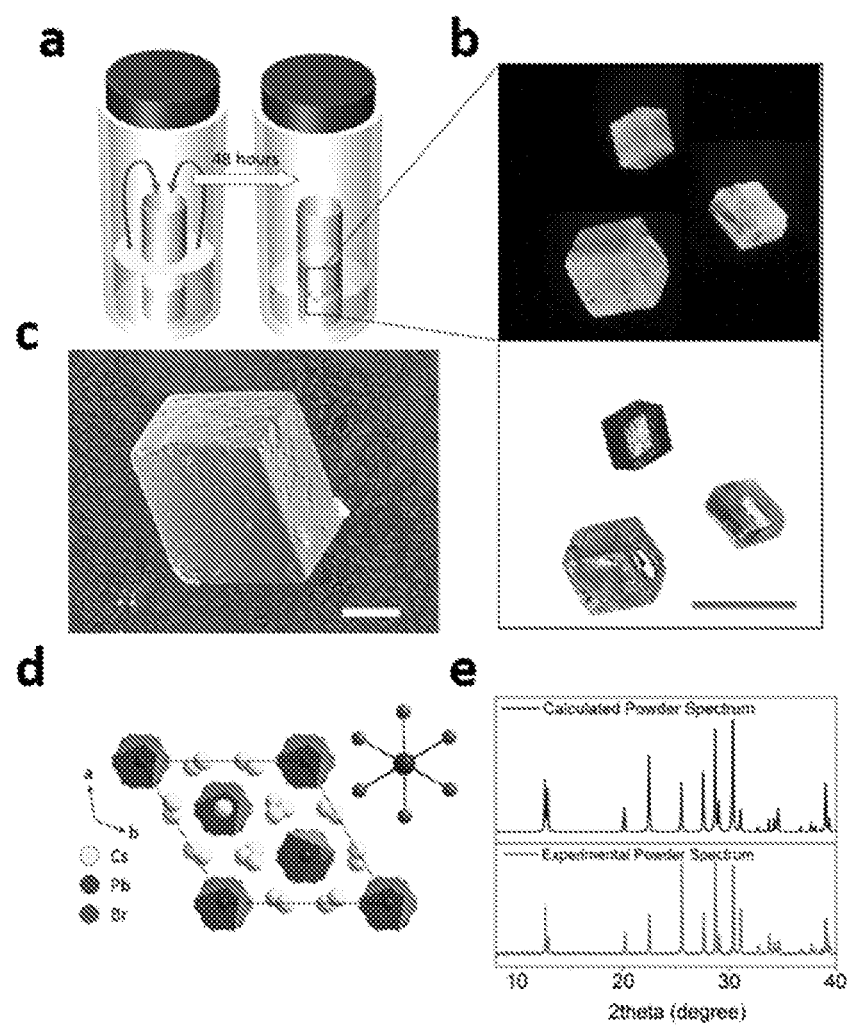
FIGS.12a-e

COMPOSITIONS AND METHODS RELATING TO LUMINESCENT STRUCTURES

TECHNICAL FIELD

The present disclosure generally relates to luminescent structures and related methods for their synthesis and/or separation.

BACKGROUND

Zero-dimensional perovskites, such as $Cs_4PbBr_6$, promise outstanding emissive properties. However, current synthetic methods for such highly emissive materials are mostly based on the melting of precursor materials (such as CsBr and $PbBr_2$). Melting of precursor products usually can lead to the co-formation of undesired phases and impure products, due to incongruent melting of reaction products, such as $Cs_4PbBr_6$. Utilization of impure products is not desired as the impure products may not meet the potential physical properties of pure products, preventing the widespread adoption of highly emissive and/or luminescent structures, such as those with zero-dimensional perovskites.

Accordingly, there is a need to address the aforementioned deficiencies and inadequacies.

SUMMARY

Embodiments of the present disclosure describe a method for synthesizing a zero-dimensional perovskite comprising mixing at least one of CsR or $Cs(R)_2$ with at least one of PbR or $Pb(R)_2$ in a solvent to create a mixture, wherein R is at least one of a halogen, a halogen anion, a monovalent anion, or the conjugate base of an acid; heating the mixture to a temperature in a range of about 40° C. to about 180° C. and holding the mixture at the temperature for a period of time to form a precipitate, or mixing the mixture with an antisolvent vapor and exposing the mixture to the antisolvent vapor for a period of time to form a precipitate; isolating the precipitate; washing the precipitate with a wash solvent to produce a washed precipitate; and drying the washed precipitate by a drying method to produce the zero-dimensional perovskite.

In an embodiment, a method for synthesizing a zero-dimensional perovskite is provided. In an aspect, the method comprises: mixing at least one of CsR or $Cs(R)_2$ with at least one of PbR or $Pb(R)_2$ in a solvent to create a mixture, wherein R is at least one of a halogen, a halogen anion, a monovalent anion, or the conjugate base of an acid; heating the mixture to a temperature in a range of about 40° C. to about 180° C. and holding the mixture at the temperature for a period of time to form a precipitate; isolating the precipitate; washing the precipitate with a wash solvent to produce a washed precipitate; and drying the washed precipitate by a drying method to produce a zero-dimensional perovskite.

In another embodiment, a method for synthesizing a zero-dimensional perovskite is provided. In an aspect, the method comprises: mixing at least one of CsR or $Cs(R)_2$ with at least one of PbR or $Pb(R)_2$ in a solvent to create a mixture, wherein R is at least one of a halogen, a halogen anion, a monovalent anion, or the conjugate base of an acid; mixing the mixture with an antisolvent vapor and exposing the mixture to the antisolvent vapor for a period of time to form a precipitate; isolating the precipitate; washing the precipitate with a wash solvent to produce a washed precipitate; and drying the washed precipitate by a drying method to produce a zero-dimensional perovskite.

In an embodiment, a zero-dimensional perovskite composition is provided, comprising at least 95% pure solid zero-dimensional perovskite, wherein the zero-dimensional perovskite has a formula of $Cs_4Pb(R_1)_6$, wherein $R_1$ is a halogen, a halogen anion, or the conjugate base of an acid, and a photoluminescence quantum yield of about 38% or greater.

Other systems, methods, features, and advantages of the present disclosure for compositions and methods relating to luminescent structures, will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4(b) illustrates $Cs_4PbBr_6$ powder on a glass slide under ambient (left) and UV (right, 365 nm) light, according to one or more embodiments of the present disclosure.

FIG. 12(a) shows a schematic representation of the $Cs_4PbBr_6$ single crystal synthesis by the solvent vapor method, according to one or more embodiments of the present disclosure.

FIG. 12(b) shows fluorescent (top) and optical microscope picture of the single crystals (bottom) (scale bar: 500 $\mu$m), according to one or more embodiments of the present disclosure.

FIG. 12(c) shows SEM image of the single crystal (scale bar: 50 $\mu$m), according to one or more embodiments of the present disclosure.

FIG. 12(d) shows crystal structure of $Cs_4PbBr_6$ obtained from SC-XRD, with octahedral representing the isolated $PbBr_6$ characteristic of 0D perovskite, according to one or more embodiments of the present disclosure.

FIG. 12(e) shows XRD patterns of ground $Cs_4PbBr_6$ (bottom) and calculated single crystal of $Cs_4PbBr_6$ (top), according to one or more embodiments of the present disclosure.

DETAILED DESCRIPTION

Figure 1:
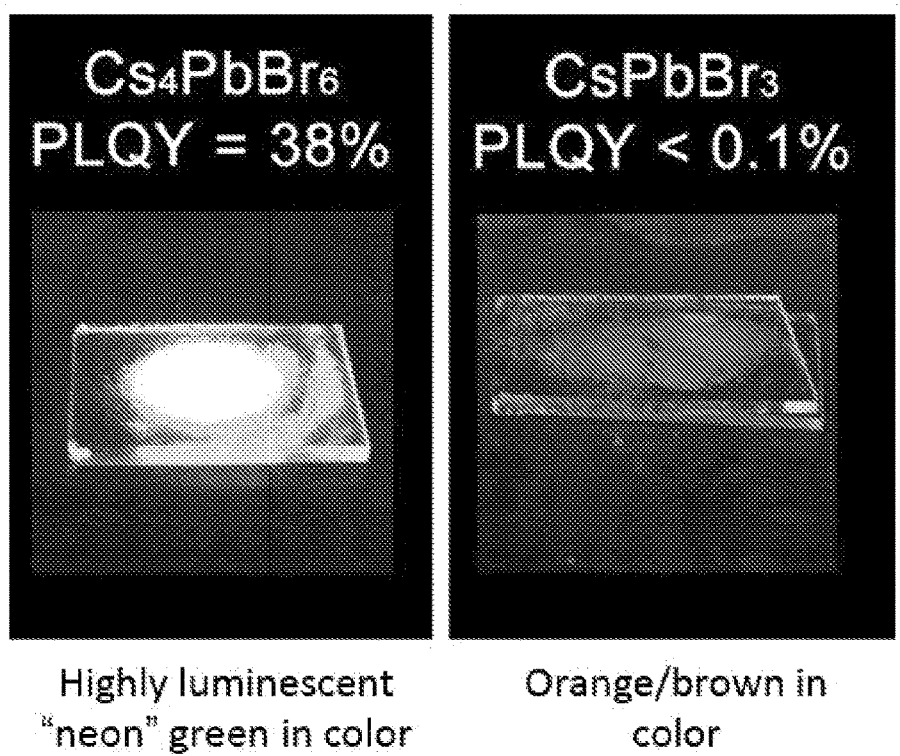
FIG. 1 shows photos perovskites excitations under ultraviolet (UV) light, according to one or more embodiments of the present disclosure.

Described below are various embodiments of compositions and methods relating to luminescent structures. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Discussion

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of sample preparation, analytical chemistry, chemical analysis, chemical synthesis, and the like, which are within the skill of the art. Such techniques are explained fully in the literature.

It is to be understood that, unless otherwise indicated, the present disclosure is not limited to particular types of compositions and methods relating to luminescent structures, particular subjects (e.g. human, animal, plant or inanimate), and particular software[s] for post-processing and analysis, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DESCRIPTION

The present disclosure is directed to compositions and methods relating to luminescent structures (e.g., pure luminescent structures). For example, the present disclosure relates to pure luminescent structures with remarkable emission properties and new solution-processed methods for the synthesis and separation of the pure luminescent structures. The photoluminescence quantum yield (PLQY) of the luminescent structures, for example $Cs_4PbBr_6$, in solid form surprisingly can reach 38% or more, while its three-dimensional counterpart—$CsPbBr_3$—exhibits almost two-half orders of magnitude lower PLQY. In various aspects this dramatic increase in photoluminescence can be due to defects in the unique crystal structure of the product, adopting the Bergerhoff-Schmitz-Dumont crystal type, in which metal-halide octahedral are spatially confined.

Described herein is a method to synthesize luminescent structures. In an embodiment, a luminescent structure can be a luminescent perovskite. In an embodiment, a luminescent structure can be a zero-dimensional (0D) perovskite. In an embodiment, a luminescent structure can be a zero-dimensional (0D) luminescent perovskite. The luminescent structures can be pure. For example, the luminescent structures can be one or more of pure luminescent perovskite and pure zero-dimensional (0D) luminescent perovskite. As used herewithin, pure is meant to mean a purity of 95% or greater. The luminescent structures of the present disclosure, such as zero-dimensional (0D) luminescent perovskite, can be used, for example, as photodetectors, light emitters (including LEDs), and light converters, among other things.

A luminescent structure or 0D perovskite as described herein can be luminescent and have the formula $Cs_4Pb(R_1)_6$, wherein $R_1$ can be an anion, a halogen, a conjugate base of an acid, or others. In an embodiment, $R_1$ is a halogen. In an embodiment, $R_1$ is a halogen anion. In an embodiment, the halogen is Cl, Br or I. In an embodiment, $R_1$ is $CH_3COO^-$. In an embodiment, a luminescent structure can be purified $Cs_4PbBr_6$. In other embodiments, a luminescent structure can be solid or solid purified $Cs_4PbCl_6$, $Cs_4PbI_6$, $Cs_4Pb(CH_3COO)_6$, or other compounds. Purified structures, compositions, or perovskites as described herein can have a purity of about 95% or greater.

In an embodiment, a luminescent structure can be a photodetector. In an embodiment, a luminescent structure can be a photodetector and can be a luminescent perovskite. In an embodiment, a luminescent structure can be a photodetector and can be a 0D luminescent perovskite. In an embodiment, a luminescent structure can be a photodetector and can be $Cs_4PbBr_6$, $Cs_4PbCl_6$, $Cs_4PbI_6$, or $Cs_4Pb(CH_3COO)_6$. In an embodiment, a luminescent structure can be an emitting 0D luminescent perovskite that can be used for example for color converters, light-emitting diodes, lasers, and other opto-electronic applications.

Starting materials for luminescent structure synthesis can have the formula CsR, $Cs(R)_2$, PbR, and $Pb(R)_2$. R can be a monovalent anion, a halogen, a halogen anion, a conjugate base of an acid, or others. In an embodiment, R is a halogen. In an embodiment, R is a halogen anion. In an embodiment, R is Br, Cl, I, or $CH_3COO$. In an embodiment, R is $Br^-$, $Cl^-$, $I^-$, or $CH_3COO^-$.

In an embodiment of luminescent structure synthesis, starting materials, such as CsBr and $PbBr_2$, can be mixed in a solvent, such as dimethyl sulfoxide (DMSO). In additional embodiments, other starting materials for the method described herein can be used, such as CsCl, CsI, $PbCl_2$, $PbI_2$, CsBr, $Cs(CH_3COO)$, $Pb(CH_3COO)_2$, $CsBr_2$, $PbBr_2$, HBr, $CsBr_2$—$PbBr_2$—HBr, among others. Other solvents can be used, such as DMSO-DMF, DMF, and GBL, among others. The starting materials, including CsBr and $PbBr_2$, can be mixed in a ratio of 0.1:1 to 1:0.1, optionally in a 1:1 ratio. In an embodiment, mixing can be done with a ratio of about 1 to about 1. In an embodiment, 1 mL of DMSO can be used for every 1 mmol of CsBr and 1 mmol of $PbBr_2$.

A precipitate may be formed by heating the mixture. In some embodiments, the mixture can be heated to a desired final temperature of about 40° C. to about 180° C., for example, to about 120° C. over a first period of time, for example, about 10 to about 300 minutes. Once the mixture reaches the desired final temperature, the mixture can be held at a temperature of about 40° C. to about 180° C., for example, at about 120° C., and incubated at the desired final temperature for a second period of time, for example, about 10 minutes to about 300 minutes, optimally for about an hour, to allow the mixture to continue to react and complete its reaction. The mixture can optionally be stirred during heating to improve reaction efficacy. This reaction can form a precipitate. The precipitate can be a powder or single crystal. In an embodiment, the precipitate can be a perovskite powder or single crystal.

In addition or in the alternative, in other embodiments, the precipitate can be formed by mixing the mixture with an antisolvent vapor and exposing the mixture to the antisolvent vapor for a period of time to form a precipitate. In general, the antisolvent vapor includes a solvent vapor in which the 0D perovskite is non-soluble, leading to decreasing solubility of 0D in entire mixture and formation of its precipitate. The antisolvent vapor may include one or more of hydrocarbons, halocarbons, ethers, and ketones. For example, the hydrocarbons may include, but are not limited to, hexane, toluene, and benzene; the halocarbons may include, but are not limited to, chloroform; the ethers may include, but are not limited to, dimethyl ether and diethyl ether; and the ketones may include, but are not limited to, acetone. These examples, however, shall not be limiting as any hydrocarbons, halocarbons, ethers, and ketones known in the art may be utilized here. The mixture can be exposed to the antisolvent vapor for a period of time to form a precipitate. The period of time can be about one hour or more. The precipitate can be a powder or single crystal. In an embodiment, the precipitate can be a perovskite powder or single crystal.

The precipitate formed by the reaction can be isolated, filtered, or otherwise separated from the solvent and other impurities or undesired reaction by-products. A precipitate formed can be isolated by filtering with a filter apparatus, for example, after heating and incubation. A filtering apparatus as described herein can be standard laboratory filter paper or Whatman® filter paper that separates the precipitate product from the solvent. The precipitation can be collected with by Buchner bulb. Also, it may be isolated by sedimenting by a centrifugation method, such as ultracentrifugation, and separated from liquid through a method such as decanting the liquid. After filtering, the precipitate can be dried at room temperature (e.g., by storing the precipitate at room temperature) or heated over a period of time to a temperature in the range of 40 to 180 QC, for example, to about 120° C., and can be held or incubated at said temperature for a period of time, for example, 0.5 to 50 hours, preferably for about three hours.

After isolation, the precipitate can be washed with a volume of a wash solvent, such as DMSO, to create a washed precipitate or washed reaction product. Other solvents such as DMSO-DMF, DMF, GBL, and others can be used in place of DMSO. It can be desirable that the precipitate formed by the reaction not be soluble in the wash solvent. During solvent wash, a purified reaction product, which can be a luminescent structure or luminescent perovskite and can be a powder, remains as a precipitate and impurities can be dissolved into and washed away with the solvent. After wash, a precipitate can be isolated again from the solvent, and can be isolated with a filtering apparatus. The washed participate can be dried by a drying method to produce a luminescent structure (e.g., a washed and/or dried precipitate). The washed precipitate can be dried and residual solvent removed by storing at room temperature or heating to an elevated temperature, such as about 100° C., and incubating or holding the washed precipitate at the elevated temperature for a period of time, for example 6 to 16 hours. As an example the washed precipitate can be incubated overnight.

A washed and dried reaction precipitate product can be a powder or single crystal. A washed and dried precipitate can have a purity of about 95% or greater. A washed and dried reaction product can be a luminescent structure. A washed and dried reaction product can be a luminescent perovskite. A washed and dried reaction precipitate product can be a zero-dimensional (0D) luminescent perovskite. A washed and dried reaction precipitate product can be a zero-dimensional luminescent perovskite and have a purity of at least about 95%. A washed and dried reaction precipitate product can be a purified $Cs_4PbBr_6$ composition that can be at least 95% pure, up to 100% pure solid $Cs_4PbBr_6$. A washed and dried precipitate can be a purified $Cs_4PbBr_6$ composition with a photoluminescence quantum yield (PLQY) of at least about 38% (e.g., about 38% to about 40%) and an emission peak at 515-525 nm following excitation at 365 nm. As used herein, a purified $Cs_4PbBr_6$ composition can be a powder. In additional embodiments, a washed and dried reaction precipitate product can be $Cs_4PbCl_6$, $Cs_4PbI_6$, $Cs_4Pb(CH_3COO)_6$, or others.

Embodiments of the present disclosure further describe a zero-dimensional perovskite composition, comprising at least 95% pure solid zero-dimensional perovskite, wherein the zero-dimensional perovskite has a formula of $Cs_4Pb(R_1)_6$ wherein $R_1$ is a halogen, a halogen anion, or the conjugate base of an acid and a photoluminescence quantum yield of about 38% or greater. In any one or more aspects, the zero-dimensional composition can be at least one of purified $Cs_4PbBr_6$, $Cs_4PbCl_6$, $Cs_4PbI_6$, or $Cs_4Pb(CH_3COO)_6$. The zero-dimensional perovskite composition can be a purified $Cs_4PbBr_6$ composition, comprising at least 95% pure solid $Cs_4PbBr_6$ with a photoluminescence quantum yield of at least about 38% and an emission peak at about 515-525 nm following excitation at 365 nm.

Also described herein is a $Cs_4PbBr_6$ composition. The $Cs_4PbBr_6$ composition can be a powder or single crystal and can have a purity of about 95% to about 100%. The $Cs_4PbBr_6$ composition can have a purity of about 100%. In an embodiment, a purified $Cs_4PbBr_6$ composition can be a 95% or greater pure solid powder $Cs_4PbBr_6$. The $Cs_4PbBr_6$ composition can have a photoluminescence quantum yield (PLQY) of at least about 38% and an emission peak at about 515-525 nm following excitation at 365 nm.

PLQY's of the perovskite compositions described herein can be at least about 38% or greater, at least about 35% or greater, at least about 30% or greater, at least about 25% or greater, at least about 20% or greater, at least about 15% or greater, or at least 15% or greater. As used herein, an emission peak is not intended to encompass only one wavelength. Emission peaks can encompass one or more wavelengths at one or more intensity, they can be sharp or broad, and can vary depending on the specific composition.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure Example 1

Photoluminescence quantum yield (PLQY) of semiconductor materials define their trap state densities and applicability for optoelectronic applications like solar cells, color converters, lasers, light-emitting diodes, and others. An ideal emitter can exhibit near-unity PLQY due to absence of trap states within its band gap. Recent reports on perovskite single crystals have estimated an ultralow trap state densities—in the order of $\sim10^{10}$ cm$^{-3}$. Yet, those bulk perovskites are not optically emissive, most likely due to the shared octahedra of the crystal structure that prevents quantum confinement of the charge carriers. As a result, the excitons have extremely low binding energies (~15-50 meV which is in the order of thermal energy) and dissociate to free carriers. Quantum confinement and consequent high PLQY are realized in perovskite quantum dots due to the nanoscale physical sizes stabilized by ligands, and in perovskite thin films due to the nanoscale grain sizes. Unfortunately, the PLQY of quantum dots remarkably decreases when they are made into solid form, because of loss of capping ligands causing further aggregation. On the other hand, in thin films perovskites, the abundance of grain boundaries are detrimental to their stability.

Figure 2A:
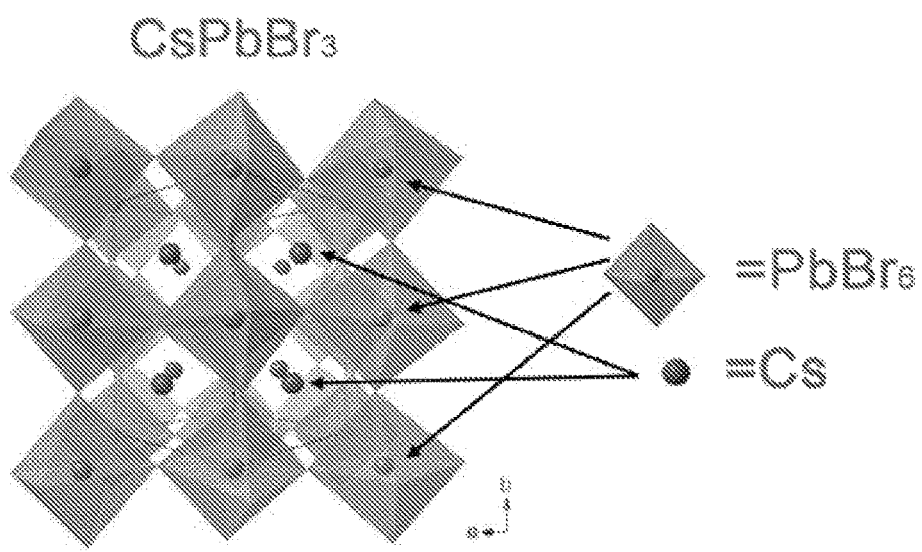
FIG. 2(a) depicts a crystal structure of $CsPbBr_3$, according to one or more embodiments of the present disclosure.

An alternative approach to achieve quantum confinement can be to reduce the dimensionality of perovskites. The general formula of perovskites can be written as $AnBX_{2+n}$, where A is a monovalent cation like $CH^3NH^{3+}$, $Cs^+$, etc., B is a divalent metal, usually $Pb^{2+}$ or $Sn^{2+}$, and X is a halogen anion. When n=1, the perovskite is referred as to three-dimensional (3D) perovskite. For example, $CsPbBr_3$ is a 3D perovskite, the crystal structure of which is based on the corner-shared $PbBr_6$ octahedra (FIG. 1, FIG. 2(a)). For n=2 to n=4, these perovskites are considered to be low-dimensional perovskites in which the octahedra form planes (if n=2, they are called 2D), chains (if n=3, 1 D), and isolated dots (if n=4, 0D).

Figure 2B:
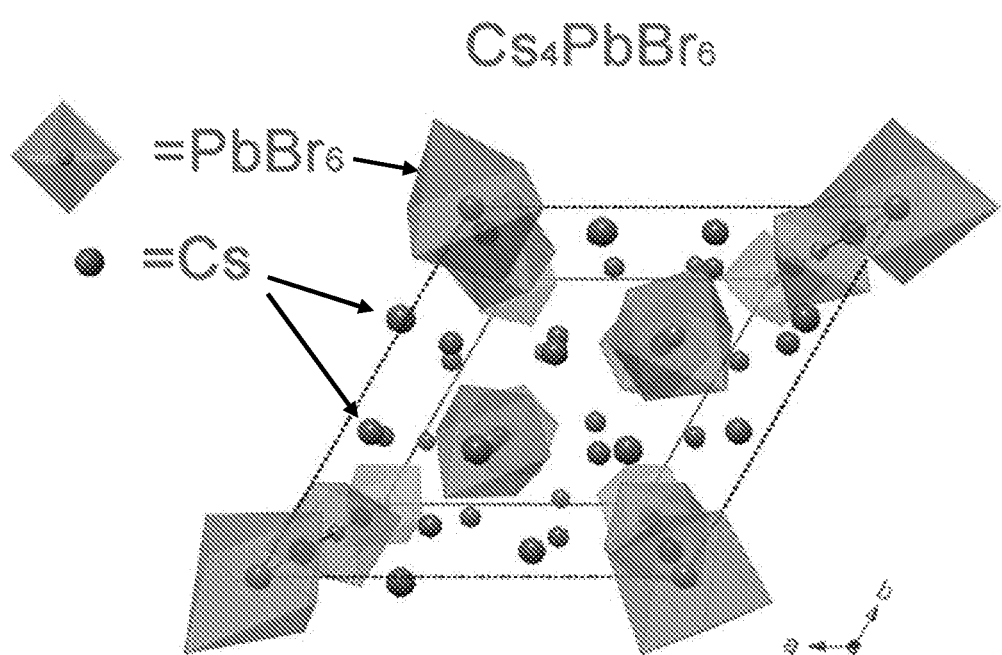
FIG. 2(b) depicts $Cs_4PbBr_6$ featuring corner-shared and isolated $PbBr_6$ octahedra, according to one or more embodiments of the present disclosure.

Recent reports have demonstrated increases in PLQY upon reducing the dimensionality of perovskites. This could be due to an increase in the exciton binding energy. For example, PLQY of 2D lead bromide-based perovskite solids was reported to be ~9%. Also, $Cs Pb_2 Br_5$ with 2D-like structure showed significantly strong emission. It's PLQY was reported to be ~87% in solution and expected to be also high in solid form compared to the 3D $CsPbBr_3$ (the actual PLQY for the $CsPb_2Br_5$ solid was not reported). These findings open the possibility that in the extreme case when those octahedra are isolated by Cs bridges to form 0D perovskites, then exceptionally high PLQY could be achieved. For instance, in $Cs_4PbBr_6$ (FIG. 1, FIG. 2(b)), which adopts the crystal structure of the Bergerhoff-Schmitz-Dumont type. The optical properties of $Cs_4PbBr_6$ have been partially investigated in the literature to date, but issues relating to synthesis and co-existence of $CsPbBr_3$ in $Cs_4PbBr_6$ compositions hinders its proper characterization and a detailed understanding of the structure-property relation of those materials. Discussion herein relates to introducing a new solution-processed chemical method to produce pure $Cs_4PbBr_6$ solids and study of their optical properties.

A new solution-processed synthesis and separation of pure $Cs_4PbBr_6$ with remarkable emission properties is reported herein. It was found that the photoluminescence quantum yield (PLQY) of $Cs_4PbBr_6$ in solid form can reach about 38% or more, while its three-dimensional counterpart—$CsPbBr_3$ exhibits almost two-half orders of magnitude lower PLQY. This dramatic increase in photoluminescence could be attributed to the defects in the unique crystal structure of $Cs_4PbBr_6$, adopting the Bergerhoff-Schmitz-Dumont crystal type, in which metal-halide octahedra are spatially confined. Provided herein are new synthetic avenues towards widespread adoption and application of these highly emitting zero-dimensional perovskites for color converters, light-emitting diodes, lasers, and other optoelectronic applications.

Figure 3A:
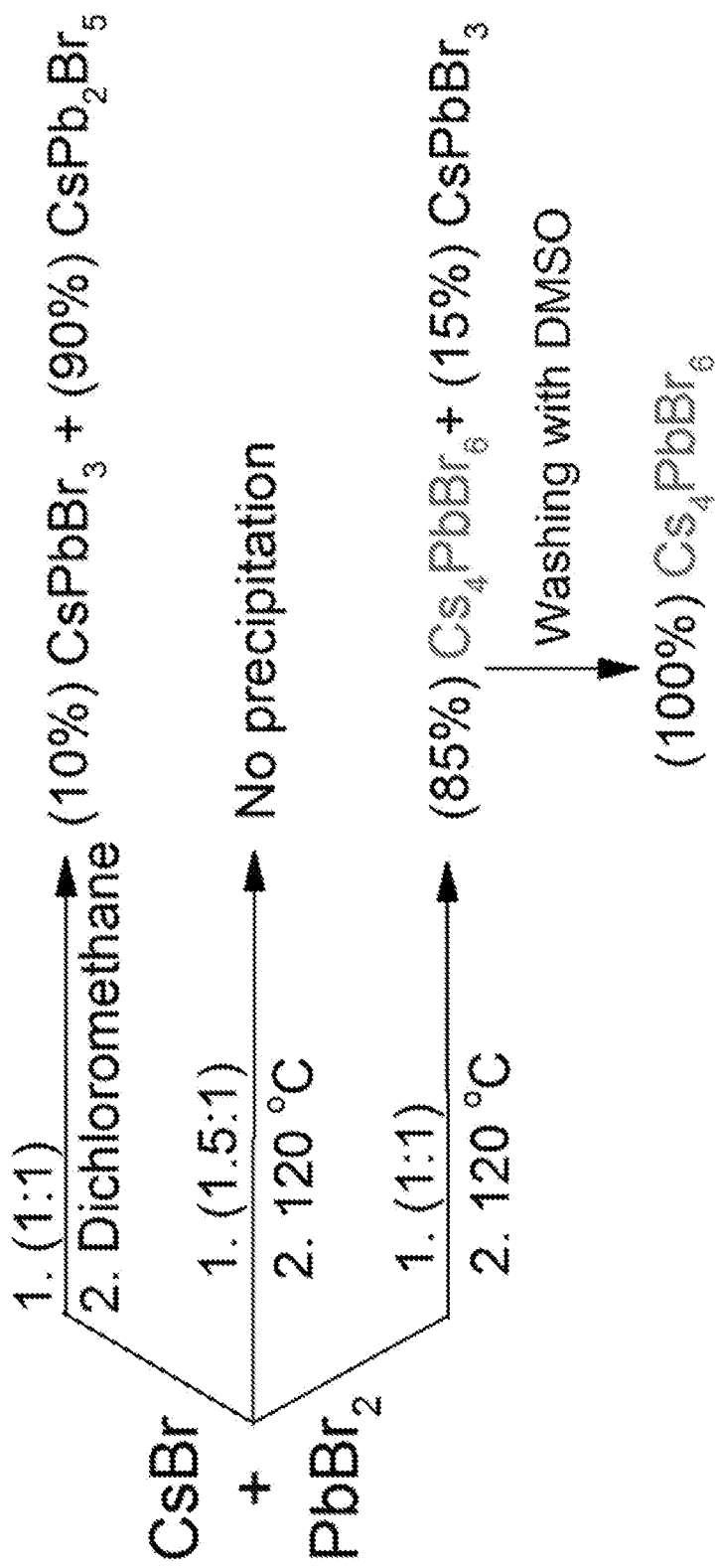
FIG. 3(a) is schematic representation of the optimization of a method for the synthesis and separation of a perovskite (percentages represent the ratios of x-ray diffraction or XRD peak intensities), according to one or more embodiments of the present disclosure.
Figure 7:
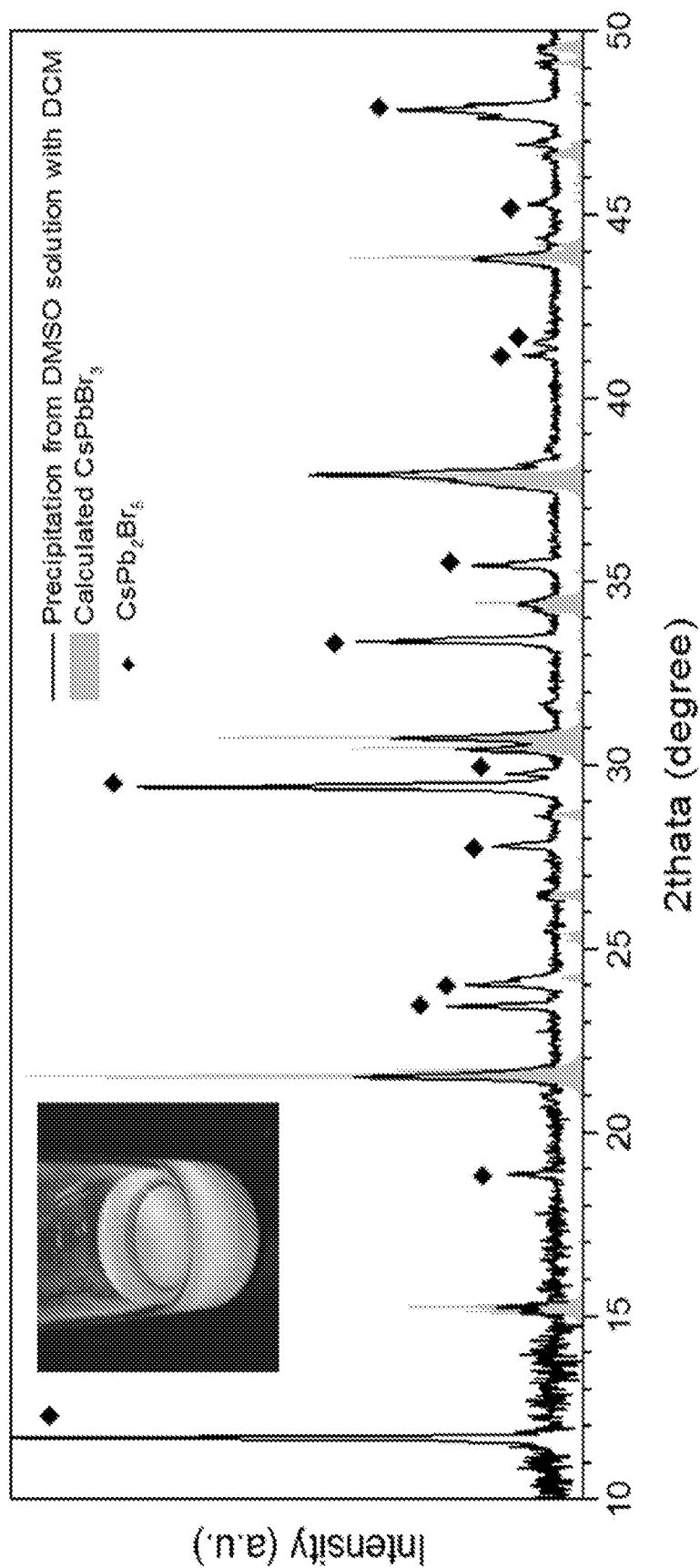
FIG. 7 illustrates rapid precipitation from a reaction of $CsBr/PbBr_2$ (1/1) solution in dimethylsulfoxide (DMSO) with DCM, according to one or more embodiments of the present disclosure. X-ray diffraction (XRD) shows that the resultant powder can be the mixture of $CsPbBr_3$ and $CsPb_2Br_5$.

As aforementioned, one problem to be addressed is the isolation of $Cs_4PbBr_6$ from any other additional phases or compounds during synthesis. FIG. 3(a) summarizes some of the explored parameters used to optimize $Cs_4PbBr_6$ synthesis to arrive to pure $Cs_4PbBr_6$. Rapid precipitation from $CsBr/PbBr_2$ (1/1) in dimethyl sulfoxide (DMSO) solution was used as a starting point. An antisolvent (dichloromethane, DCM) was then added. However, this reaction scheme resulted in a mixture of undesired phases—$CsPbBr_3$ and $CsPb_2Br_5$ (FIG. 7).

Figure 9:
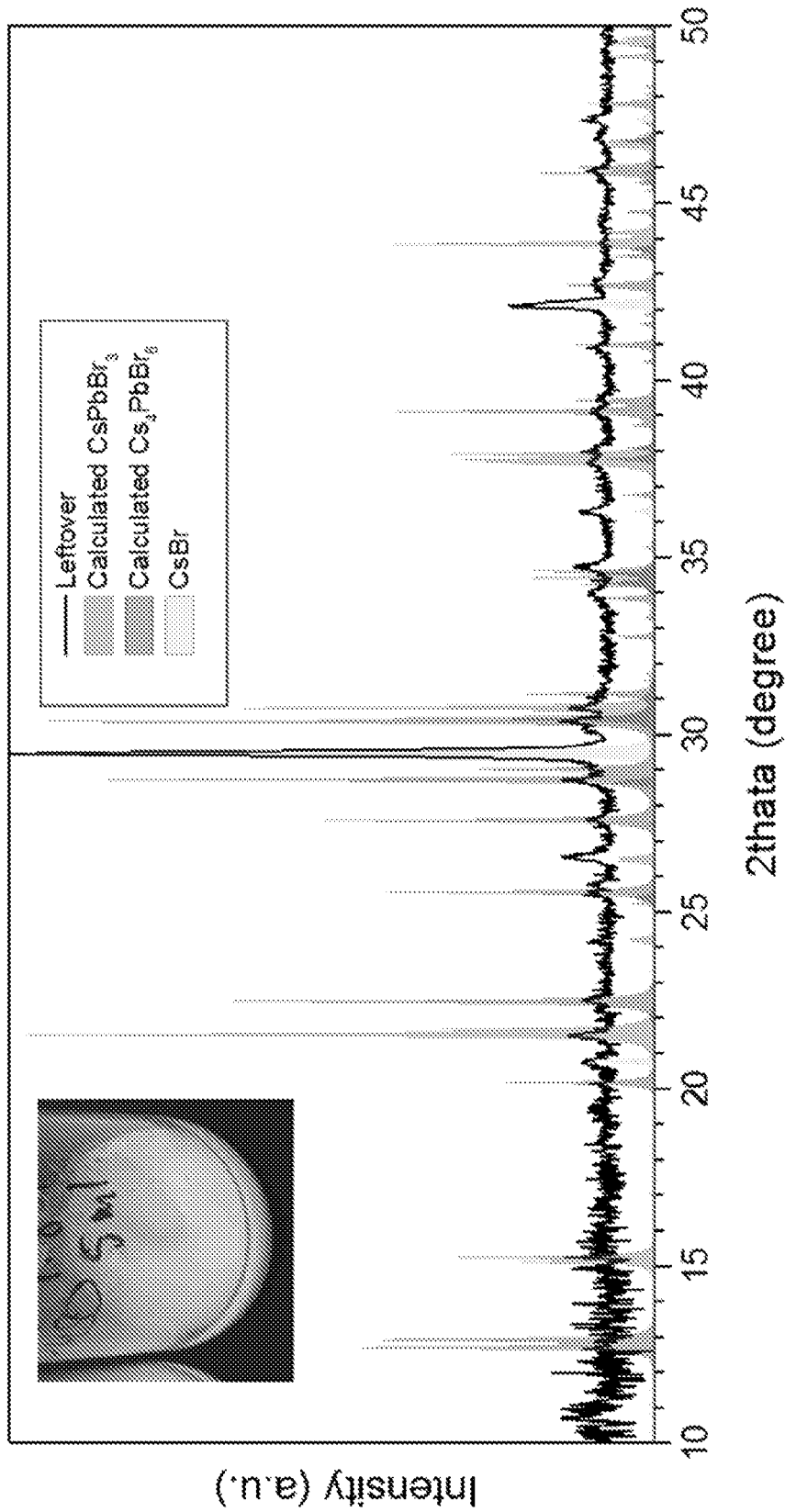
FIG. 9 shows undissolved powder from a reaction of $CsBr/PbBr_2$ (1.5/1) in DMSO, according to one or more embodiments of the present disclosure. XRD data shows it can consist mainly of CsBr, $CsPbBr_3$, and $Cs_4PbBr_6$.
Figure 10:
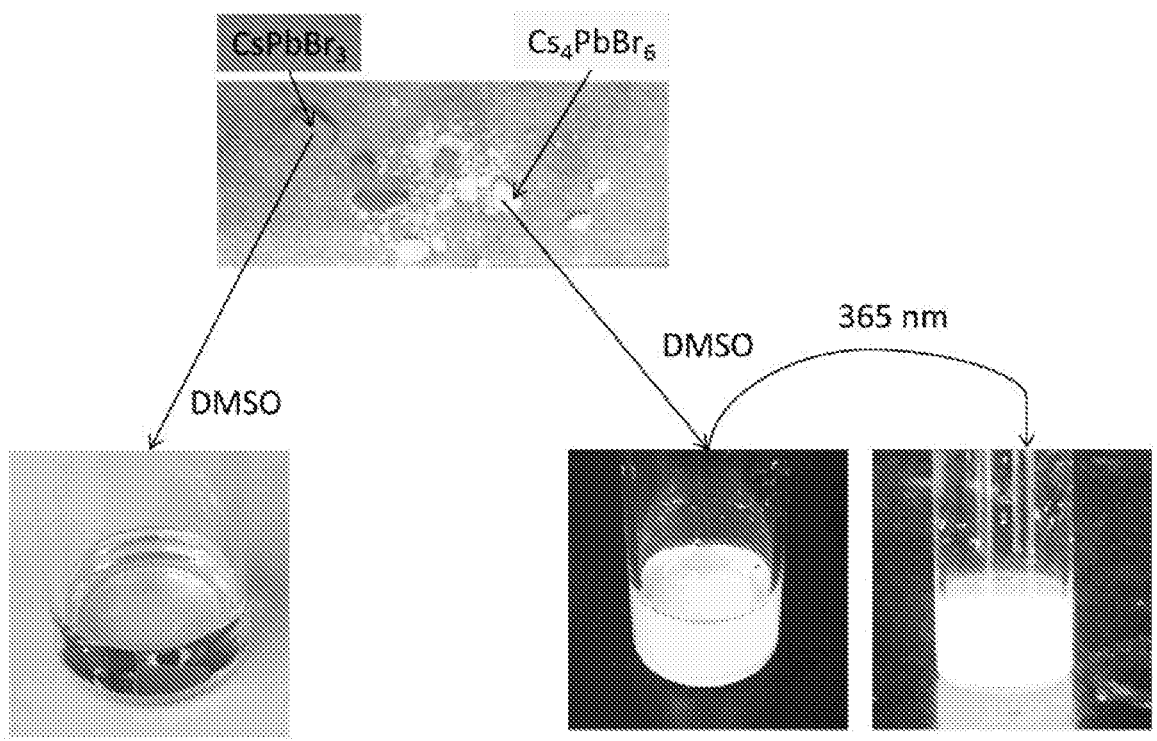
FIG. 10 is an example demonstration of good solubility of $CsPbBr_3$ and poor solubility of $Cs_4PbBr_6$ in DMSO, according to one or more embodiments of the present disclosure.

From here, inverse solubility was undertaken, in which precipitation occurs when the solution is heated. It was observed that $CsBr/PbBr_2$ (1/1) in DMSO at 120° C. produces predominantly solid $Cs_4PbBr_6$ with some traces of $CsPbBr_3$. Because $Cs_4PbBr_6$ is richer in cesium concentration than $CsPbBr_3$, the increase of CsBr precursor concentration in solution could induce precipitation of only the $Cs_4PbBr_6$ phase. Further increase in CsBr concentration to the ratio of (1.5/1) was tried, but did not show any precipitation (FIG. 8), which could be attributed to the limited solubility of CsBr in DMSO. Undissolved CsBr can partially react with $PbBr_2$, thus decreasing the final concentration of $PbBr_2$ in solution (FIG. 9). The solubility of these perovskites was investigated further, and fortunately it was found that DMSO can dissolve $CsPbBr_3$, but not $Cs_4PbBr_6$ (FIG. 10).

Figure 3B:
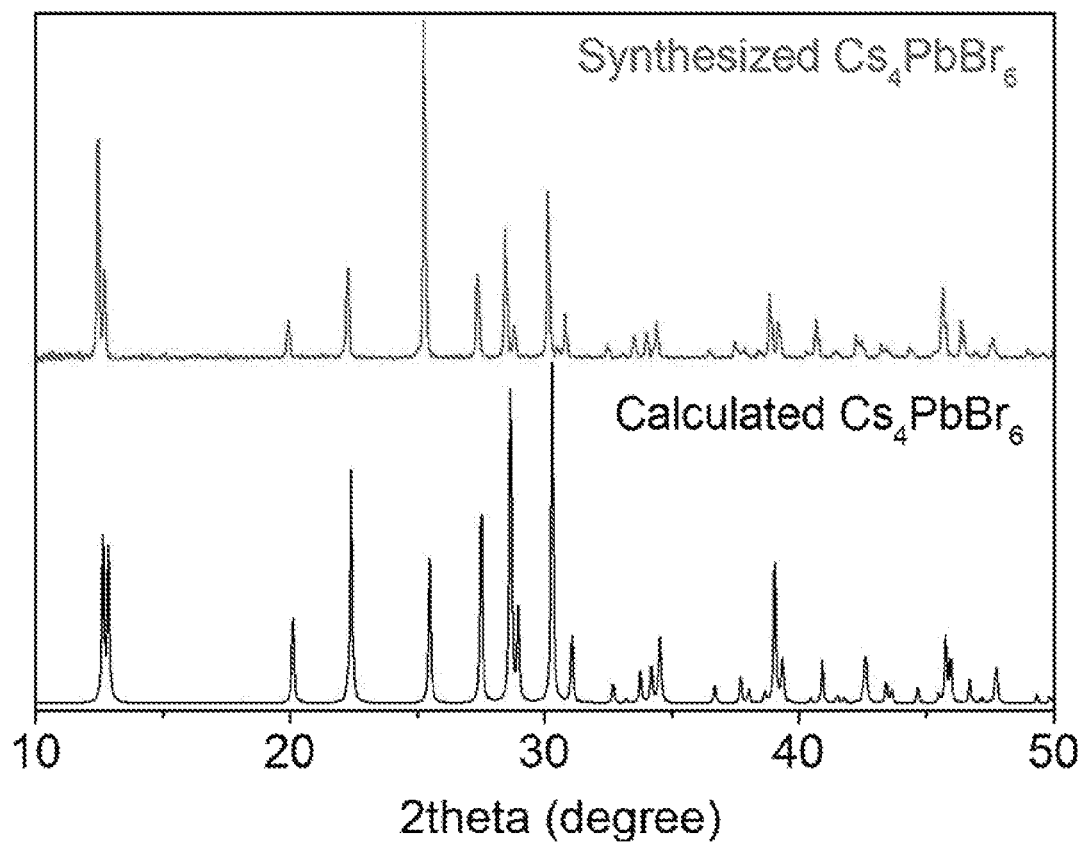
FIG. 3(b) depicts powder x-ray diffraction (PXRD) patterns of synthesized solid $Cs_4PbBr_6$ along with the calculated spectrum of the same, according to one or more embodiments of the present disclosure.
Figure 4A:
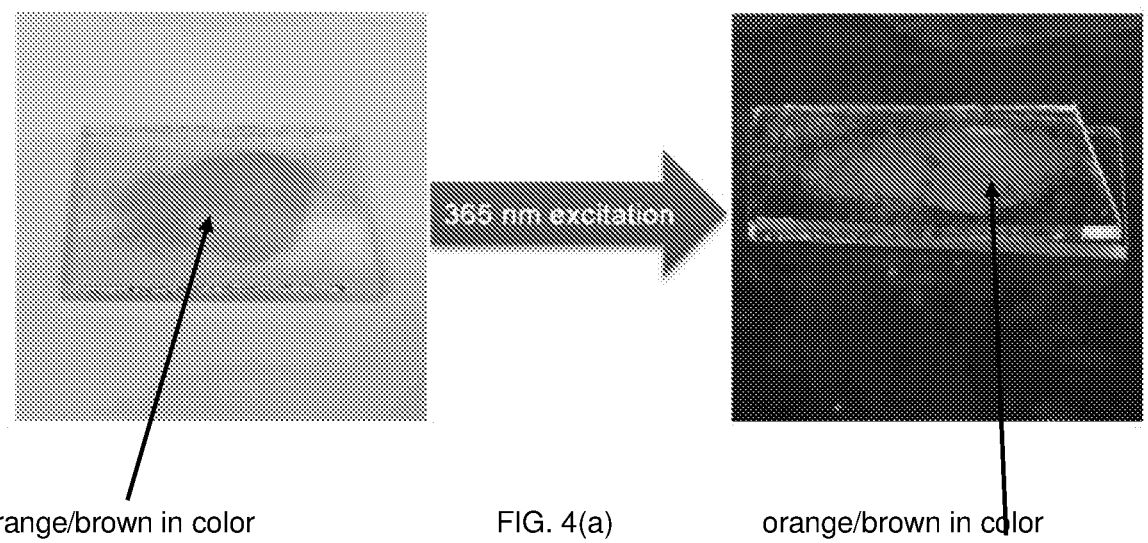
FIG. 4(a) shows ground $CsPbBr_3$ on a slide under ambient (left) and UV (right, 365 nm) light, according to one or more embodiments of the present disclosure.
Figure 4C:
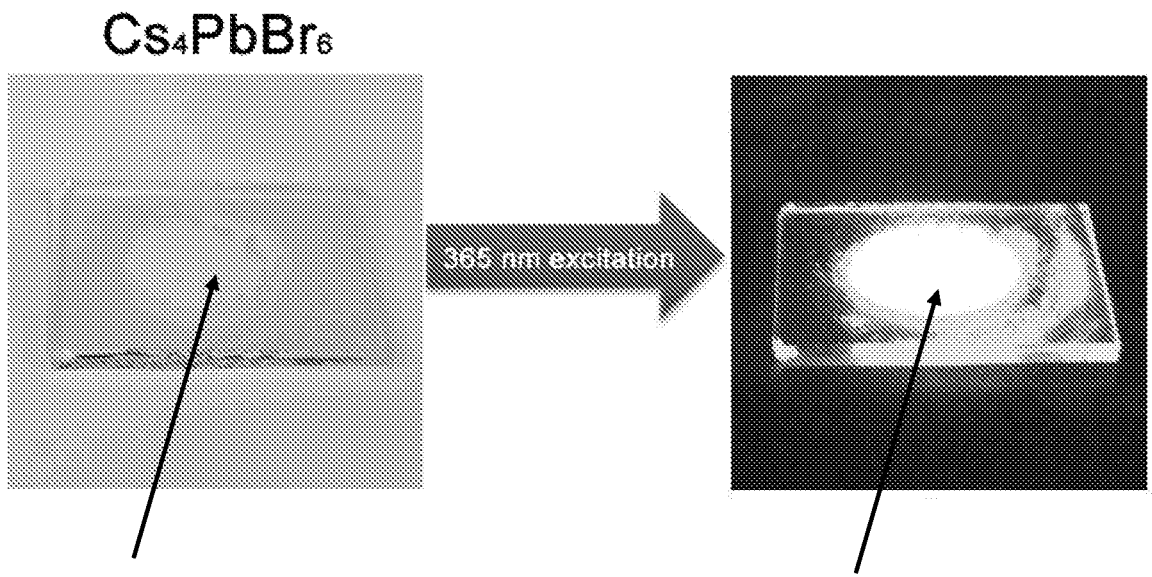
FIG. 4(c) depicts the absorption spectra of solid $Cs_4PbBr_6$ excited at 365 nm wavelength, according to one or more embodiments of the present disclosure.
Figure 4C:
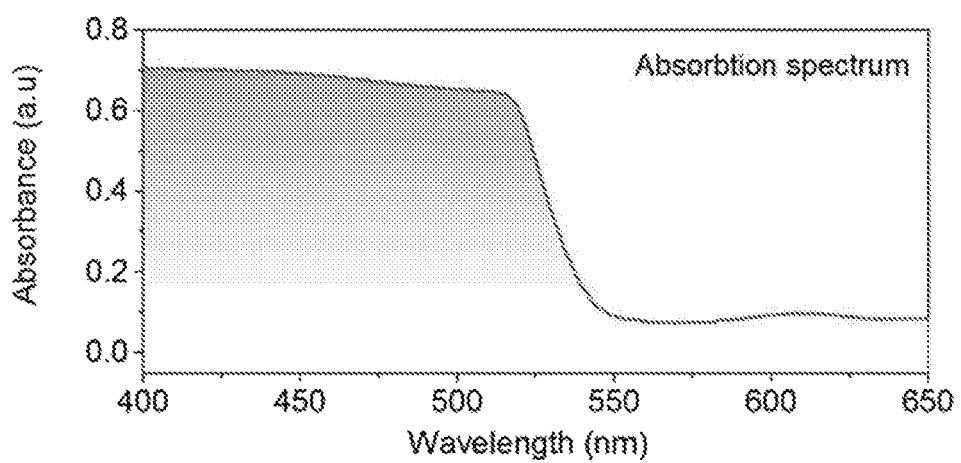
Figure 4D:
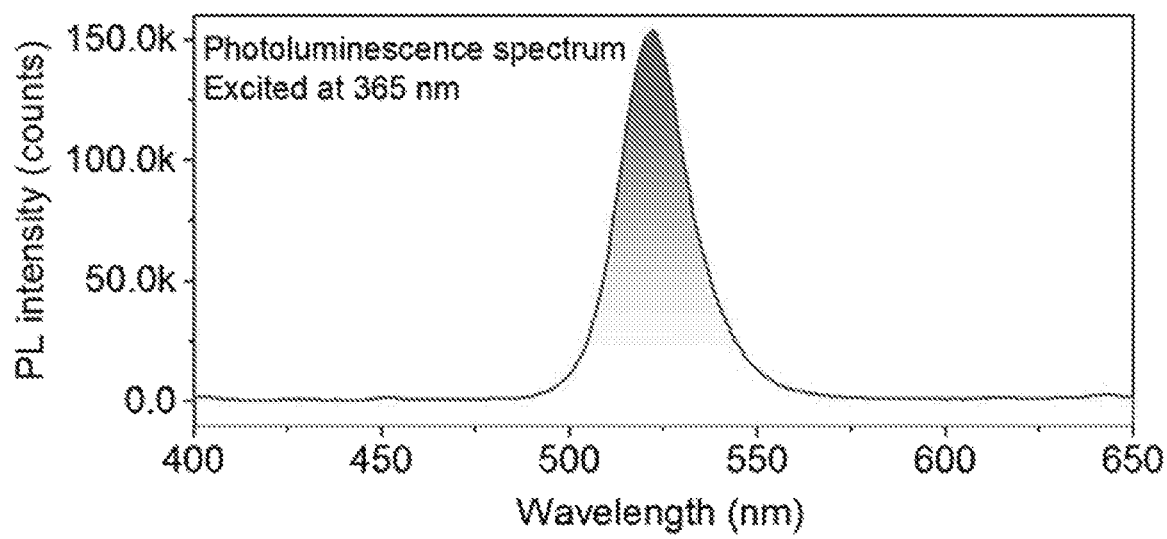
FIG. 4(d) shows photoluminescent (PL) spectra of $Cs_4PbBr_6$ excited at 365 nm wavelength, according to one or more embodiments of the present disclosure.

The initial $CsBr/PbBr_2$ (1/1) solution in DMSO was re-examined. The precipitate that was formed at 120° C., was collected and washed with DMSO. The DMSO wash successfully washed out $CsPbBr_3$ from the product mixture, leaving behind a pure $Cs_4PbBr_6$ phase. Powder X-ray diffraction (PXRD) of the purified product sample after DMSO wash and drying confirms the presence of monophasic $Cs_4PbBr_6$, which is consistent with the calculated PXRD (FIG. 3(b)). The details of the optimized recipe can be found in Supporting Information section below.

As discussed above, low-dimensional perovskites exhibit interesting behavior which can arise from defect in the crystal structure, which could be clearly traced from their optical properties (FIG. 4). Whereas the ground 3D $CsPbBr_3$ crystal is not luminescent under UV light (FIG. 1, FIG. 4(a)), synthesized and DMSO-purified $Cs_4PbBr_6$ solid as described herein is bright green under the same conditions (FIG. 1, FIG. 4(b)). The absorption spectrum of $Cs_4PbBr_6$ edges at 540 nm (FIG. 4(c)), consistent with the values reported in literature. The PL spectrum shows an emission peak at 525 nm (FIG. 4(d)).

Figure 5A:
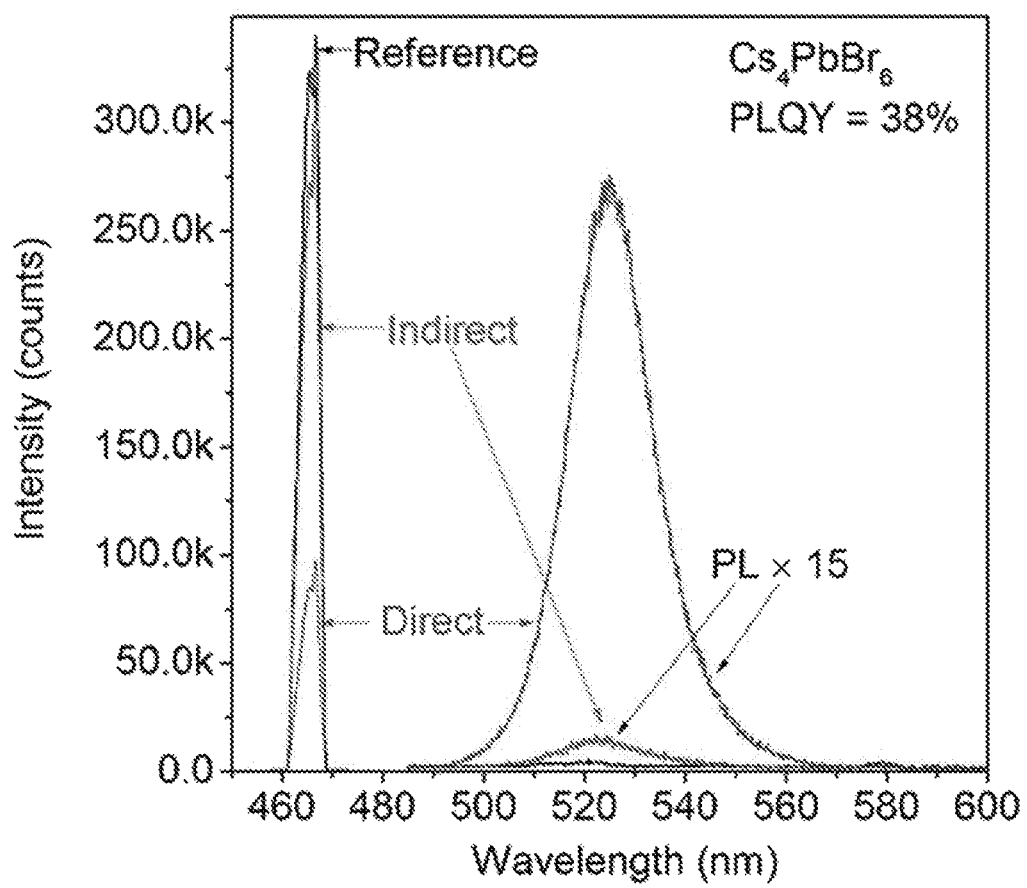
FIG. 5(a) depicts the complete spectra of $Cs_4PbBr_6$ for photoluminescent quantum yield (PLQY) measurement using integrating sphere, according to one or more embodiments of the present disclosure. The PL spectra were enlarged by a factor of 15 for clarity.
Figure 5B:
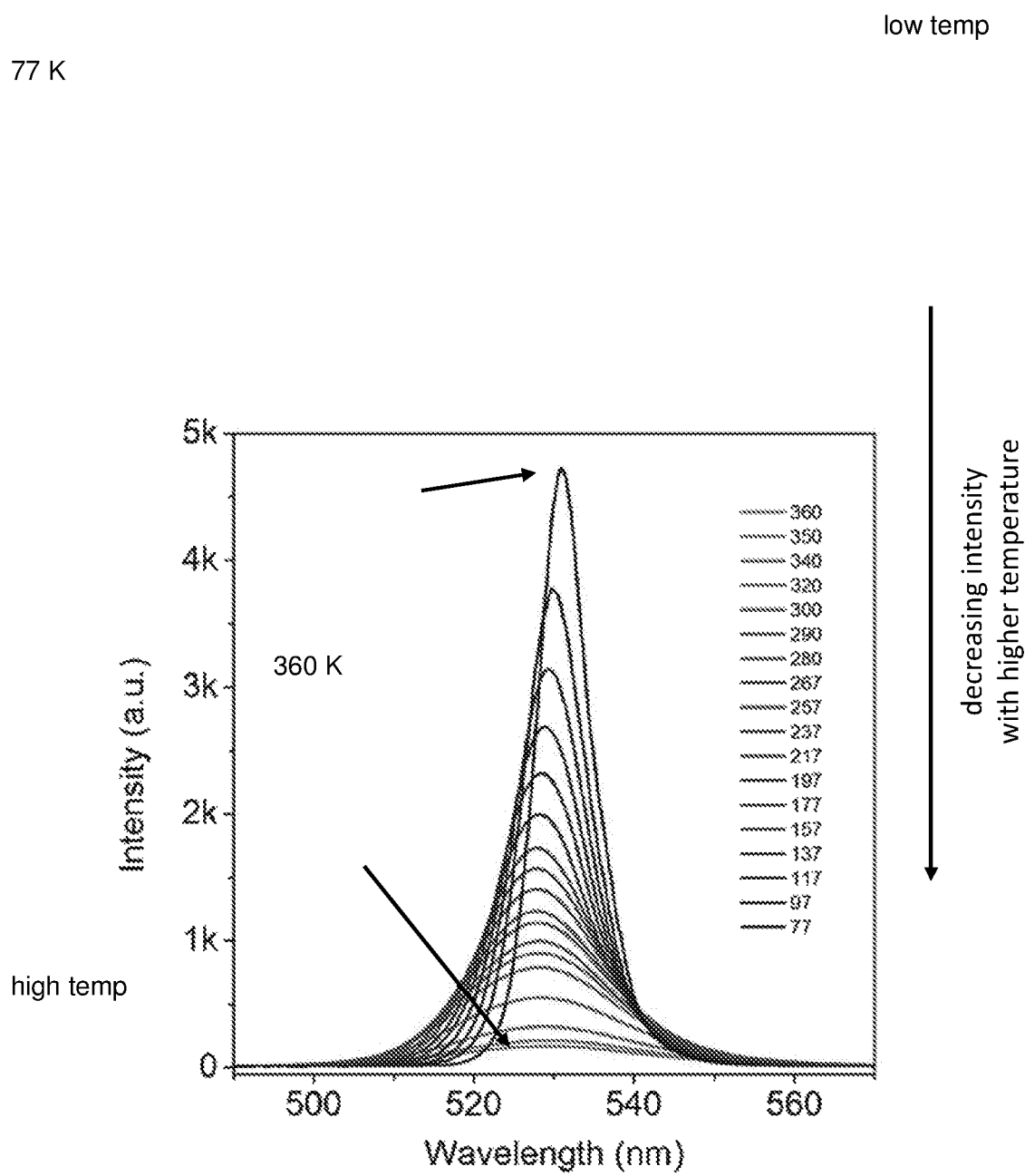
FIG. 5(b) shows temperature-dependent PL spectra from 77 K to 360 K, according to one or more embodiments of the present disclosure.
Figure 5C:
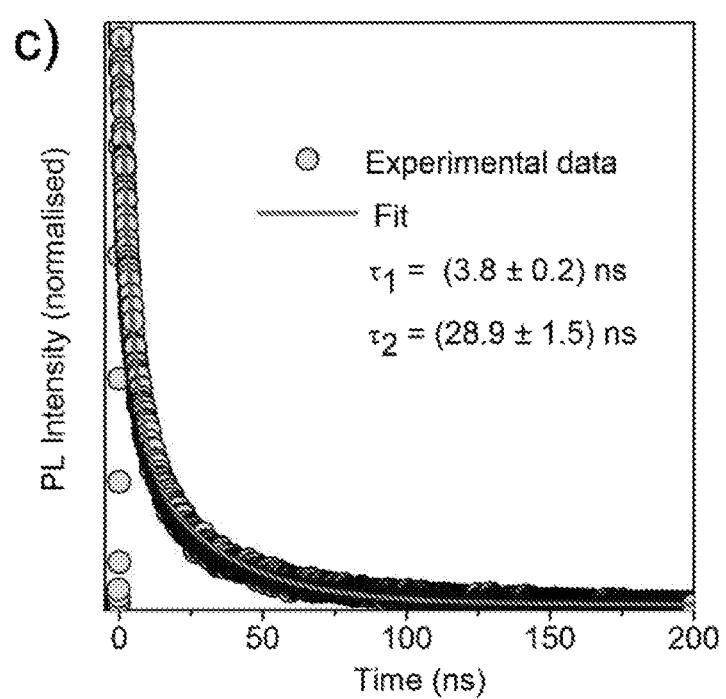
FIG. 5(c) shows PL lifetime decay of $Cs_4PbBr_6$, according to one or more embodiments of the present disclosure.

To quantify the PL, the PLQY of these solids (FIG. 5(a)) was measured following the method reported by de Mellon et. al. While measurement of the PLQY of 3D perovskite was not possible because of low luminescence (PLQY<0.1%), that of 0D perovskite was found to be remarkably high (~38%). Alternatively, from temperature dependent PL measurements (FIG. 5(b)), an estimated ~40% PLQY at room temperature (FIG. 11) was obtained, which is in a good agreement with the previous measurement. This increased difference in PLQY in 0D and 3D perovskites can originate from their unique structures. In 3D perovskite, due to low binding energies of excitons, the exitons dissociate into free carriers and travel across the corner-shared octahedra. In contrast, the generated excitons in 0D perovskites, such as the DMSO-purified $Cs_4PbBr_6$ as described herein, are confined in the defects of the crystal structure. As a result, the exciton binding energy in $Cs_4PbBr_6$ can be estimated to be much higher $-353\pm40$ meV (FIG. 11), an order of magnitude higher than in 3-D perovskites. Interestingly, the PL lifetime in 0D perovskites (FIG. 5(c)) was found to be an order of magnitude shorter than that of 3D perovskite analogues, which may be attributed to the dramatic increase in the exciton binding energy.

Figure 6A:
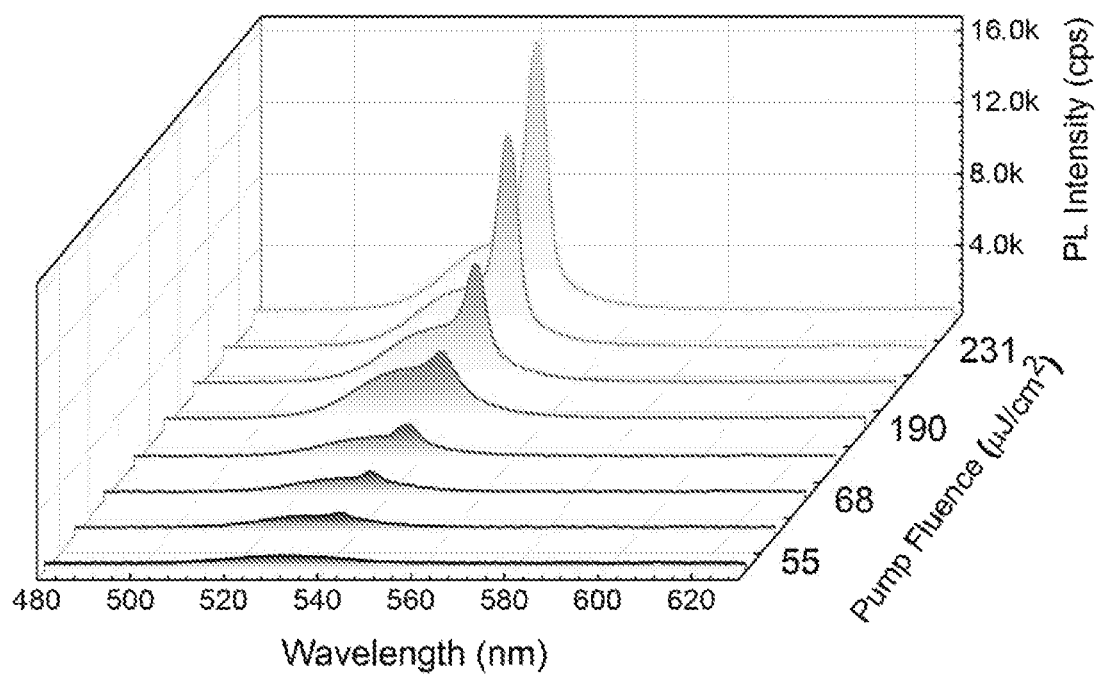
FIG. 6(a) depicts the evaluation of PL spectra with increasing optical pump fluence for solid $Cs_4PbBr_6$ powders, according to one or more embodiments of the present disclosure.
Figure 6B:
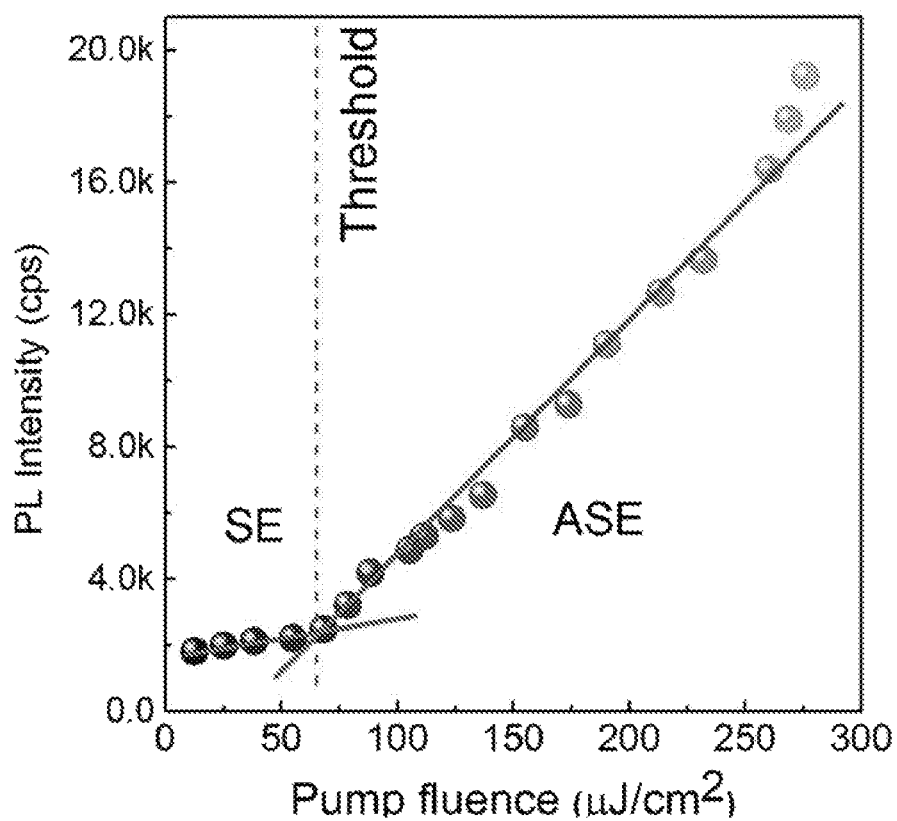
FIG. 6(b) shows PL intensity as a function of pump fluence for solid $Cs_4PbBr_6$ powders, according to one or more embodiments of the present disclosure. Transition from spontaneous emission (SE) to amplified spontaneous emission (ASE) with the threshold value of 68 $\mu J/cm^2$.

To illustrate the importance of high PLQY in optoelectronic devices, the propensity of $Cs_4PbBr_6$ solid for amplified spontaneous emission (ASE) was tested through one-photon pumping under ambient conditions (room temperature and 55±5% humidity) (FIG. 6(a)). It was found that $Cs_4PbBr_6$ shows ASE when the pump fluence is above 68 µJ/cm$^2$ (FIG. 6(b)). This threshold can be notably lower than in 3D perovskite powders, and even lower than the corresponding threshold values in perovskite quantum dot thin films.

In one or more aspects, a method for isolation of a $Cs_4PbBr_6$ monophasic solid is provided herein, and its emission properties studied. The isolated $Cs_4PbBr_6$ demonstrates a high PLQY compared to its 3D perovskite counterparts. These results represent a better understanding of the Cs—Pb—Br perovskite family. Previous reports on $Cs_4PbBr_6$ solids show the coexistence of both 0D and 3D phases, which limited applications that rely on one of the compounds. Further, the use of solids for ASE was demonstrated, that showing the isolated solids can be good color converters, light-emitting diodes (LED), and other optoelectronic applications.

Example 2

As mentioned in the example 1, conventional methods of 0D perovskites synthesis use antisolvent methods where the reaction mixture is mixed with the liquid solvent (called "antisolvent") in which perovskite is non-soluble. However, one of the drawbacks of this technique is the formation of impure Cs$_4$PbBr$_6$ mixture phases during the crystallization process. On the other hand, it was discovered that pure Cs$_4$PbBr$_6$ single crystals can be easily obtained through the vapor-assisted crystallization using antisolvents (FIG. 12(a)). To obtain the crystals, 1 ml of precursor solution (0.25M lead bromide (PbBr$_2$), and 0.25M cesium bromide (CsBr) in dimethyl sulfoxide (DMSO)), is placed into the small crystallization flask, inserted in a closed container with 4 ml of diethyl-ether (DE) which plays the role of the antisolvent. The low boiling point and high vapor pressure of DE enable its diffusion into the crystallization flask at room temperature, without any additional heating. After 48 hours, an immiscible interface between DE and DMSO is formed in the crystallization flask, resulting in the growth of several small crystals. The crystals are collected and washed with IPA/DMSO (3:1 v:v) mixed solvent (to remove the leftover solution) then dried and stored in a nitrogen atmosphere. The size of the crystals varies according to the crystallization time (i.e. more time spent for crystallization results in larger crystals): here, 500-μm crystals after 48 hours of crystallization were collected. The crystals exhibited a pale green color under ambient light, but when exposed to 365 nm UV irradiation, they luminesced bright green light (FIG. 12(b)). Scanning Electron Microscopy (SEM) images confirmed the high quality of the crystals with smooth surfaces and well-defined rhomboid shape (FIG. 12(c)).

To investigate the crystalline structure of Cs$_4$PbBr$_6$ and the quality of the crystals, single crystal X-Ray Diffraction (SC-XRD) was performed. SC-XRD data confirmed that Cs$_4$PbBr$_6$ crystallizes in the trigonal space group R-3c symmetry (FIG. 12(d)). The unit cell dimensions are a=b=13.722 Å, and c=17.299 Å. The structure of Cs$_4$PbBr$_6$ consists of isolated octahedral PbBr$_6^{4-}$ ions interspersed with Cs$^+$ cations. To validate the purity of our crystals, the calculated XRD spectrum of the crystals was compared with the experimental powder XRD spectrum of ground 0D perovskite powder XRD spectrum (FIG. 12(e)), and confirmed the single and high pure phase of the crystals that were grown.

The PL profile of Cs$_4$PbBr$_6$ exhibited a standard Gaussian peak centered at 524 nm with a FWHM of 24 nm. The PL peak partially overlapped with the absorption edge with a small Stokes shift of ~28 meV. The PLQY values of Cs$_4$PbBr$_6$ single crystals were measured with an integrating sphere under an excitation wavelength of 420 nm. PLQY values between 40-42% were obtained from different crystals of differed sizes. It is understood that these PLQY values are the highest reported to date for single crystals of halide perovskites.

Supplemental Information

Synthesis of Cs$_4$PbBr$_6$:PbBr$_2$ (3 mmol) and CsBr (3 mmol) were dissolved in dimethyl sulfoxide (DMSO, 3 ml) and stirred for one hour. The solution was filtered and heated to 120° C. and held at this temperature for 3 h forming a precipitate. Then the precipitation was collected and washed with DMSO. The powder was collected and dried at 100° C. under vacuum overnight.

The powder X-ray diffraction (PXRD) was performed on a Bruker AXS D8 diffractometer using Cu-Kα radiation.

The steady-state absorption was recorded using a Cary 6000i UV-Vis-NIR Spectrophotometer with integrated sphere in diffuse-reflectance mode.

The photoluminescence spectra were characterized using a Horiba JY LabRAM Aramis spectrometer with an Olympus 50× lens in a Linkam THMS600 stage. A 473 nm laser was used as the excitation source.

FIG. 7 shows rapid precipitation from CsBr/PbBr$_2$ (1/1) solution in DMSO with DCM. XRD shows that the resultant powder can be a mixture of CsPbBr$_3$ and CsPb$_2$Br$_5$.

Figure 8:
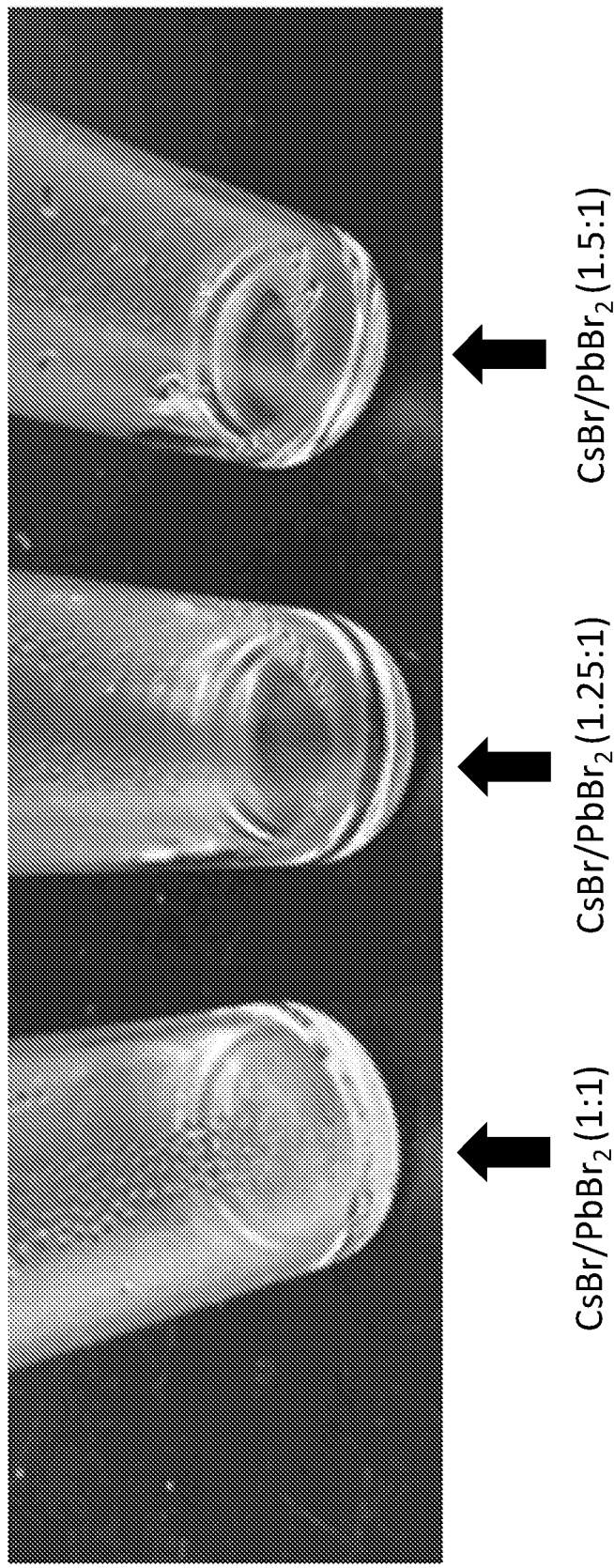
FIG. 8 depicts filtered solutions, products resulting from reactions of $CsBr/PbBr_2$ (1/1, leftmost in figure), (1.25/1, middle in figure), and (1.5/1, rightmost in figure) in DMSO after 3 hours at 120° C., according to one or more embodiments of the present disclosure.

FIG. 8 demonstrates filtered solutions of CsBr/PbBr$_2$ (1/1), (1.25/1) and (1.5/1) in DMSO after keeping at 120° C. for 3 h.

FIG. 9 depicts undissolved powder from CsBr/PbBr$_2$ (1.5/1) in DMSO. It can consist of mainly CsBr, CsPbBr$_3$ and Cs$_4$PbBr$_6$. CsBr does not dissolve completely, and when precipitated, can partially react with PbBr$_2$. This can result in decreasing PbBr$_2$ concentration. Therefore, the inverse solubility from this solution may not be observed.

FIG. 10 is an example demonstration of suitable solubility of CsPbBr$_3$ and unsuitable solubility of Cs$_4$PbBr$_6$ in DMSO. This observation allows for the clean separation of Cs$_4$PbBr$_6$ from CsPbBr$_3$.

Figure 11:
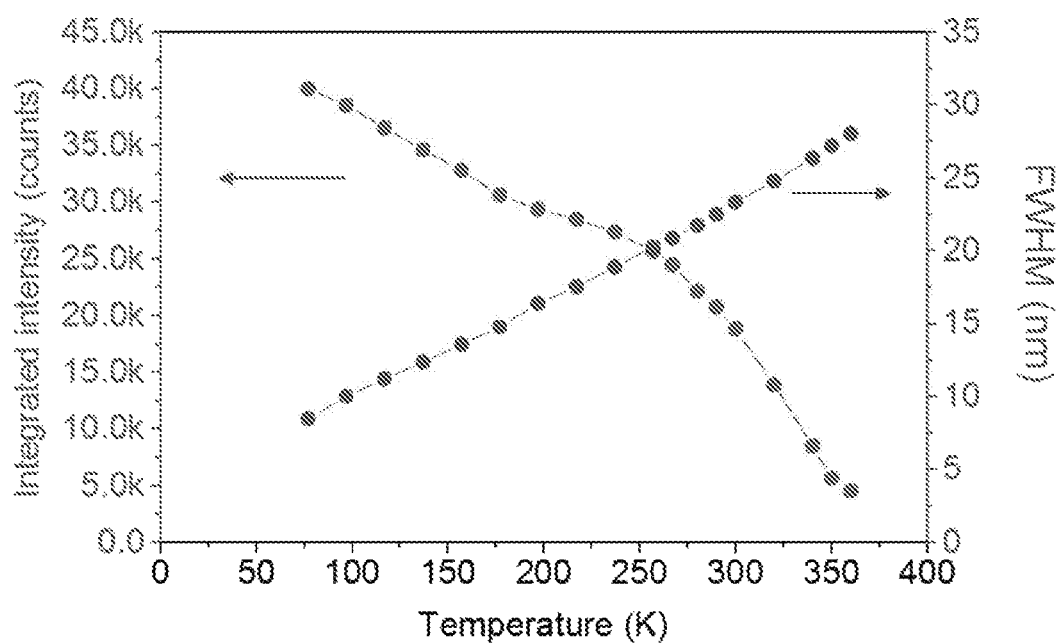
FIG. 11 shows an example analysis of temperature-dependent PL of a perovskite powder, according to one or more embodiments of the present disclosure.

FIG. 11 is an analysis of temperature-dependent PL. The integrated PL peak at 300 K is 20 k. When extrapolated at 0K it reaches 45 k. Thus, the PLQY at 300 K can be 20 k/45 k=40%.

FWHM decreases by decreasing the temperature, reaching 10 nm at 77K.

Exciton binding energy can be estimated using the following fitting.

$$I_T = \frac{I_0}{1 + A\exp\left(-\frac{E_B}{k_B T}\right)}$$

where $I_T$ is the integrated intensity at T K, $E_B$ is the binding energy, and $k_B$ is the Boltzmann constant.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Therefore, the following is claimed:

1. A zero-dimensional perovskite in the form of a powder, the powder consisting essentially of: at least 95% pure single phase zero-dimensional perovskite having a formula of Cs$_4$Pb(R$_1$)$_6$ and a photoluminescence quantum yield of about 38% or greater, wherein R$_1$ is a halogen anion, a monovalent anion, or the conjugate base of an acid.

2. The zero-dimensional perovskite of claim 1, wherein the zero-dimensional perovskite formula is $Cs_4PbBr_6$ and an emission peak at about 515-525 nm following excitation at 365 nm.

3. The zero-dimensional perovskite of claim 1, wherein $R_1$ is at least one of Br, Cl, I, and $CH_3COO$.

4. The zero-dimensional perovskite of claim 1, wherein $R_1$ is a halogen anion and the powder has a crystal structure in which metal-halide octahedra are spatially confined.

5. The zero-dimensional perovskite of claim 1, wherein the zero-dimensional perovskite is a powder consisting essentially of 95% to about 100% $Cs_4PbBr_6$.

6. A method for synthesizing a zero-dimensional perovskite in the form of a powder, the method comprising:
mixing at least one of CsR and $Cs(R)_2$ with at least one of PbR and $Pb(R)_2$ in a solvent to create a mixture, wherein R is at least one of a halogen anion, a monovalent anion, and a conjugate base of an acid;
heating the mixture to a temperature in a range of about 40° C. to about 180° C. and holding the mixture at the temperature for a period of time to form a precipitate, or
mixing the mixture with an antisolvent vapor and exposing the mixture to the antisolvent vapor for a period of time to form a precipitate;
isolating the precipitate;
washing the precipitate with a wash solvent to produce a washed precipitate; and
drying the washed precipitate by a drying method to produce the zero-dimensional perovskite composition;
wherein the dried precipitate is a powder consisting essentially of at least 95% pure single phase zero-dimensional perovskite having a formula of $Cs_4Pb(R)_6$ and a photoluminescence quantum yield of about 38% or greater.

7. The method of claim 6, wherein R is at least one of Br, Cl, I, and $CH_3COO$.

8. The method of claim 6, wherein the mixing is done with a ratio of about 1 to about 1.

9. The method of claim 6, wherein in the heating step the temperature is about 120° C.

10. The method of claim 6, wherein CsBr and $PbBr_2$ are mixed.

11. The method of claim 6, wherein the solvent is selected from the group consisting of DMSO, DMSO-DMF, DMF, and GBL.

12. The method of claim 6, wherein the antisolvent is one or more of hydrocarbons, halocarbons, ethers, and ketones.

13. The method of claim 6, wherein the holding period of time is about one hour or more.

14. The method of claim 6, wherein isolating the precipitate includes:
filtering the precipitate with a filtering apparatus to obtain the isolated precipitate; and
storing at room temperature or heating the isolated precipitate to about 120° C. and holding the isolated precipitate at said temperature for about three hours.

15. The method of claim 6, wherein the wash solvent is selected from the group consisting of DMSO, DMSO-DMF, DMF, and GBL.

16. The method of claim 6, wherein the drying method comprises storing the washed precipitate at room temperature or heating the washed precipitate at about 100° C. for a period of time.

17. The method of claim 16, wherein the period of time for the drying step is about 6 hours to about 16 hours.

* * * * *